(12) United States Patent
Khosravy et al.

(10) Patent No.: US 8,621,653 B2
(45) Date of Patent: Dec. 31, 2013

(54) SECURE LOCATION COLLECTION AND ANALYSIS SERVICE

(75) Inventors: Moe Khosravy, Bellevue, WA (US); Christian Liensberger, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 45 days.

(21) Appl. No.: 13/316,569

(22) Filed: Dec. 12, 2011

(65) Prior Publication Data
US 2013/0152215 A1     Jun. 13, 2013

(51) Int. Cl.
H04L 29/06     (2006.01)

(52) U.S. Cl.
USPC .............. 726/28; 713/156; 713/171; 713/176; 713/178; 713/191; 726/1; 726/2; 726/3; 726/4; 726/21; 726/27; 705/14.4; 340/8.1

(58) Field of Classification Search
USPC .......... 713/156, 171, 176, 178, 191; 726/1–4, 726/21, 27; 705/14.4; 340/8.1
See application file for complete search history.

(56) References Cited

U.S. PATENT DOCUMENTS

| | | | |
|---|---|---|---|
| 7,359,716 B2 * | 4/2008 | Rowitch et al. | ............. 455/456.3 |
| 7,818,588 B2 * | 10/2010 | Duri et al. | ...................... 713/193 |
| 8,285,484 B1 * | 10/2012 | Lau et al. | ...................... 701/468 |
| 2006/0174329 A1 * | 8/2006 | Dublish | ............................ 726/4 |
| 2010/0077484 A1 * | 3/2010 | Paretti et al. | ...................... 726/26 |
| 2010/0100972 A1 * | 4/2010 | Lemieux et al. | ................. 726/34 |
| 2010/0228612 A1 * | 9/2010 | Khosravy et al. | ............. 705/14.4 |
| 2010/0323715 A1 * | 12/2010 | Winters | ...................... 455/456.1 |
| 2010/0332479 A1 | 12/2010 | Prahlad et al. | |
| 2011/0227699 A1 * | 9/2011 | Seth et al. | ........................ 340/8.1 |
| 2012/0144452 A1 * | 6/2012 | Dyor et al. | .......................... 726/4 |
| 2012/0159172 A1 * | 6/2012 | Saxena et al. | .................. 713/171 |
| 2013/0059603 A1 * | 3/2013 | Guenec et al. | .............. 455/456.2 |

OTHER PUBLICATIONS

Stuedi, et al., "WhereStore: Location-based Data Storage for Mobile Devices Interacting with the Cloud", Retrieved at <<http://research.microsoft.com/pubs/131474/wherestore.pdf>>, Proceedings of the 1st ACM Workshop on Mobile Cloud Computing & Services: Social Networks and Beyond (MCS), Jun. 15, 2010, pp. 1-8.

(Continued)

*Primary Examiner* — Brandon Hoffman
*Assistant Examiner* — Hee Song
(74) *Attorney, Agent, or Firm* — Rau Patents, LLC (57) ABSTRACT

A location collection system is described herein that provides a uniform facility for reporting location data to a cloud-based service from a variety of devices, and that provides a uniform facility for accessing aggregated location data collected by the cloud-based service. The system collects location information related to a user and reports the location information to a central service to provide a variety of useful services to the user. By providing a big, secure location vault in the cloud, the system enables big data analytics to be used to allow current and future questions to be asked of this data and to correlate this with other data to enable new scenarios not yet enabled. Thus, the location collection system provides a model to report, gather, and analyze location data across devices and users.

20 Claims, 4 Drawing Sheets

(56) References Cited

OTHER PUBLICATIONS

Puttaswamy, et al., "Preserving Privacy in Location-based Mobile Social Applications", Retrieved at <<http://www.cs.ucsb.edu/~krishnap/papers/lbsa-hotmobile10.pdf>>, Proceedings of the 11th Workshop on Mobile Computing Systems & Applications (HotMobile), Feb. 22-23, 2010, pp. 1-6.

Mun, et al., "Personal Data Vaults: A Locus of Control for Personal Data Streams", Retrieved at <<http://enl.usc.edu/papers/cache/Mun10a.pdf>>, Proceedings of the 6th International Conference, (Co-NEXT), Nov. 30-Dec. 3, 2010, pp. 12.

Huang, et al., "Secure Data Processing Framework for Mobile Cloud Computing", Retrieved at <<http://ieeexplore.ieee.org/stamp/stamp.jsp?tp=&arnumber=5928886>>, IEEE Conference on Computer Communications, INFOCOM Workshop on cloud computing, Apr. 15-10, 2011, pp. 614-618.

Shahabi, Prof. Cyrus, "A Geospatial Framework for Dynamic Route Planning Using Congestion Prediction in Transportation Systems", Retrieved at <<http://www.metrans.org/research/final/09-26_Shahabi_final.pdf>>, Final Report-METRANS Project 09-26, Jan. 2011, pp. 1-35.

"Things to Consider Before Moving From Tape to Cloud Storage", Retrieved at <<http://www.spamlaws.com/moving-from-tape-to-cloud-storage.html>>, Retrieved Date: Sep. 1, 2011, pp. 2.

Shanklin, Mitchell, "Mobile Cloud Computing", Retrieved at <<http://www.cse.wustl.edu/~jain/cse574-10/ftp/cloud/index.html>>, Retrieved Date: Sep. 1, 2011, pp. 5.

\* cited by examiner

SECURE LOCATION COLLECTION AND ANALYSIS SERVICE

BACKGROUND

Location services are becoming a more common part of common computing devices. Global positioning system (GPS) chips first became common in dedicated devices for providing directions, but are becoming more and more common in mobile phones, portable gaming devices, and laptop computers. Computer software is beginning to use a device's current location to provide a variety of services, such as local listings (e.g., for restaurants or other services), directions, weather information, and so forth. Some operating systems have been updated to include location services application programming interfaces (APIs) that software applications can invoke to get location information in a consistent way (e.g., without modifications for different hardware types).

Location information may be determined using GPS hardware, cellular tower triangulation, Wi-Fi hotspot signal strength (compared with a known hotspot database), and so forth. The variety of devices a user may carry that are capable of detecting location data is increasing, such as mobile phones, tablets, laptop computers, gaming devices, and so forth. Each of these devices often includes a proprietary way of gathering location data and provides data for use on the device only. Some services send proprietary information to determine, for example, where a user's friends are located. Cloud-based services, such as MICROSOFT™ AZURE™ do not currently have any way to capture location data because they are dependent on information (not) provided by individual user devices.

Developers do not have an easy way to provide location-aware data from devices, applications, or automotive vehicles to a cloud service or remote storage in a way that provides easy capabilities to visualize, analyze, and predict behavior. Everything today is custom made in terms of services and is not productive to the average developer who wants to simply provide, for example, latitude and longitude information related to a user to enable second-level interactions. Thus, anyone that wants to build such applications performs redundant development effort to create infrastructure that works only for their solution. Furthermore, such developers do not have a repository that allows big data and machine learning to take advantage of this data to answer interesting questions on patterns.

SUMMARY

A location collection system is described herein that provides a uniform facility for reporting location data to a cloud-based service from a variety of devices, and that provides a uniform facility for accessing aggregated location data collected by the cloud-based service. In one embodiment, the system provides a mobile application that collects location information related to a user and reports the location information to a central service to provide a variety of useful services to the user. By providing a big, secure location vault in the cloud, the system enables big data analytics to be used to allow current and future questions to be asked of this data and to correlate this with other data to enable new scenarios not yet enabled. Because of the computing power available in the cloud, a service can provide information related to the user's location that could not be easily provided by the comparatively lower powered mobile device carried by the user. Thus, the location collection system provides a model to report, gather, and analyze location data across devices and users.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A location collection system is described herein that provides a uniform facility for reporting location data to a cloud-based service from a variety of devices, and that provides a uniform facility for accessing aggregated location data collected by the cloud-based service. In one embodiment, the system provides a mobile application that collects location information related to a user and reports the location information to a central service to provide a variety of useful services to the user. For example, imagine a mobile application that records where a user is walking to provide details about open houses or property and crime values. A service that can easily store and perform spatial analytics can immediately accelerate application development while providing the ability for others to securely gain additional insight in a secure and trusted way (e.g., derive most active hot spots in a state). By providing a big, secure location vault in the cloud, the system enables big data analytics to be used to allow current and future questions to be asked of this data and to correlate this with other data to enable new scenarios not yet enabled. Because of the computing power available in the cloud, a service can provide information related to the user's location that could not be easily provided by the comparatively lower powered mobile device carried by the user. The location collection system also places a set of semantics around location that enable further services. The system knows the data is location based and therefore can do automatic visualizations and charts, clustering visualizations on a map, and so forth. The system can use the context of how many data writers contributed to the collection of data, whether it was periodical, stationary vs. moving, and so on to draw up and recommend automatic visualizations based on these attributes. Thus, the location collection system provides a model to report, gather, and analyze location data across devices and users.

As another example, imagine an application that uses this service to track pizza deliveries and drivers. The application emits a representation state transfer (REST) POST update with location information from any device (e.g., phone, car, and so on) to update the location which can then be used to show where a customer's pizza is on route to the customer's house. In addition, the storeowner can correlate sales with a particular location over time, to see where drivers are being slowed down or ticketed, where the drivers were robbed, and so forth. By collecting and storing the data in the cloud over time, developers are able to leverage augmentation services to answer future questions while accelerating their current application goals. To do this, the system provides a uniform facility for reporting location data to the cloud. In the cloud, the system stores metadata with the location data that indicates which user the location data is associated with, privacy information such as who can access the data, and so forth. The cloud collects this information for potentially a long period (e.g., weeks, months, or years). Later, the system can aggregate the data and perform statistical operations to generate reports that summarize information from a large number of anonymized sources. This provides a new and useful source of data that does not compromise and particular user's privacy and allows for new kinds of analysis to be performed using the aggregate data.

In some embodiments, the location collection system provides a REST-based or similar service that allows any device or application to provide levels of location data to be used in application development and/or analysis (e.g., on behalf of a company, an application, or a user). For example, the service may provide a well-known uniform resource locator (URL) to which applications can report data and a predefined uniform reporting format in which the system expects to find the data. Because many devices can submit hypertext transfer protocol (HTTP) requests, the system may elect to receive location data as an HTTP POST, although any format or protocol can be used that is agreed upon by the devices and the service. In some embodiments, the system also provides one or more interfaces for allowing third parties to attach to the service to provide visualization and analytics on behalf of the data owner. For example, the system can provide a web services interface to which analysis applications can connect to access aggregate location data reported over time.

The system provides specific models for location that make sense in a big data analytics and storage model for location data. The system also provides extension mechanisms to allow geospatial visualizations and analytics engines to be used with collected location data to encourage an ecosystem of location related applications or services.

In some embodiments, the system provides a unified location where any application or device can simply hand off location data (e.g., with a timestamp) and later ask the unified location questions about the data. For example, analysis applications can ask questions that visualize patterns of travel, detect patterns of travel, detect slowdowns and stops (correlated to time), and correlate events (private data and this location data to show patterns—tickets, break ins, crime incidents, sales, and so on). The system provides a model to represent these and other interactions in a way that applications not yet built or conceived can leverage location data collected today in the future.

Figure 1:
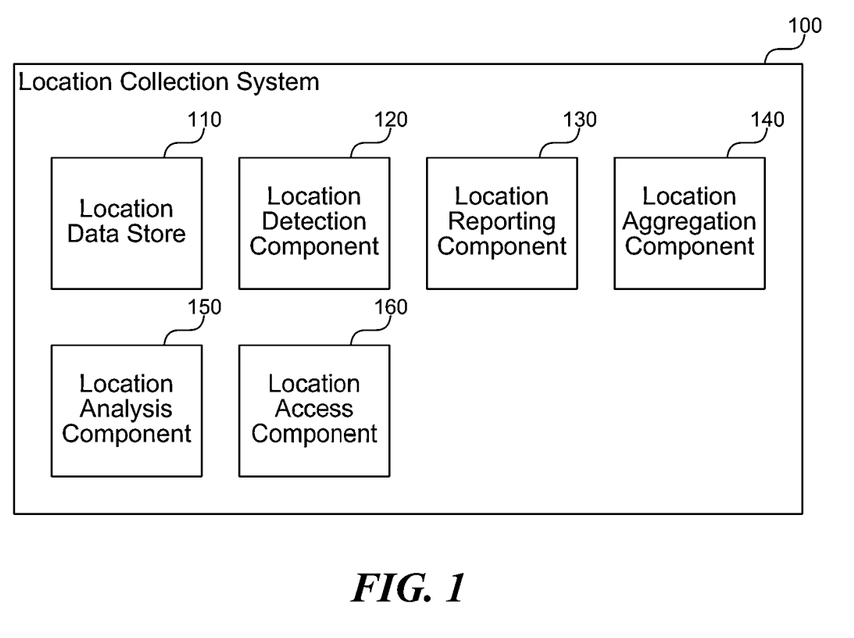
FIG. 1 is a block diagram that illustrates components of the location collection system, in one embodiment.

FIG. 1 is a block diagram that illustrates components of the location collection system, in one embodiment. The system 100 includes a location data store 110, a location detection component 120, a location reporting component 130, a location aggregation component 140, a location analysis component 150, and a location access component 160. Each of these components is described in further detail herein.

The location data store 110 stores location data collected from multiple devices. The location data store 110 may include one or more files, file systems, hard drives, databases, storage area networks, cloud-based storage services, and other facilities for persistently storing data over time. The location data store 110 receives location data reported from a variety of devices, users, applications, and other sources and collects the data for subsequent analysis. The location data store 110 also serves requests to analyze and access the data in a variety of ways to supply location information to applications. Because of the cross-device and potentially long collection history, the location data store 110 contains information identifying patterns, trends, and other aggregate results of location data.

The location detection component 120 operates at a user device to determine a present location of the device. The location may include latitude and longitude coordinates or other measurements of physical location. While GPS hardware is a common way to determine device location, other methods such as cellular tower triangulation and Wi-Fi hotspot identification can also be used to determine the user's approximate location. The component 120 may detect location information at periodic intervals (e.g., every few minutes) or upon the occurrence of some event (e.g., user unlocking of the device or other waking of the device from a sleep state), and invoke the location reporting component 130 to report location information as it is detected.

The location reporting component 130 reports location information to a uniform interface callable by multiple applications and devices and provided by a centrally available service. The component 130 uses a communication network to report location data to a REST-based service, such as through an HTTP POST to a predetermined URL. The location reporting component 130 may report location data as it is detected by the location detection component 120 or may collect location data for some period and report data collected over time in a batch. For example, for some applications daily reporting of location information may be sufficient. Because the data may be collected more frequently even though it is reported irregularly, the location data store 110 will still include fine granted trend information over time.

The location aggregation component 140 aggregates location information reported by multiple users and multiple devices to provide summary location information. Because user privacy is a serious concern, the component 140 may anonymize any data by removing user identifying information before providing the data in any form that could allow an unauthorized party to access information related to a user. The system 100 may ensure, for example, that data is available from a threshold number of users before reporting aggregate data, such as trends. The location aggregation component 140 can aggregate location information on a user level, such that user information obtained over time and from potentially many devices is available from a uniform interface, and can aggregate location information across users and devices, so that general trend information can be discovered by analyzing the data.

The location analysis component 150 provides one or more data analysis tools for detecting trends in aggregated location information. The analysis tools may include collection of historical trends, discovery of patterns, statistical analysis to answer particular questions, and so forth. The system 100 may provide a pluggable model whereby developers can provide custom location analysis modules that run in the cloud and analyze collected data in specific ways useful to a particular developer. For example, an owner of a store with numerous delivery drivers may commission a data analysis tool that reports aggregate data for all of the owner's drivers, outlier data related to individual drivers, routes that are most profitable, and so on. In some embodiments, the component 150 provides automated analysis based on the known semantics of the location information. The system collects semantic information about collected location information and can analyze the data automatically using attributes of both the location information as well as associated content provided by the user to facilitate fast business intelligence.

The location access component 160 provides a uniform interface for accessing collected and aggregated location information. The interface may include a web page, mobile application, desktop application, or programmatic interface through which users or application developers can view collected location information. The view provided may include textual reports, graphs, data visualizations, and other forms of reports. The location access component 160 may request authentication information and compare received authentication information with stored user profile data to restrict who can access what location data. For example, a user may be able to access his own location data but not that of another user unless that user authorizes him to do so. The system 100 may also provide an interface through which users can control when, how, and to whom their location data is provided. For example, a delivery driver may expose location data reported during particular hours or by a particular delivery application to a manager, but not other location data.

The computing device on which the location collection system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored on computer-readable storage media. Any computer-readable media claimed herein include only those media falling within statutorily patentable categories. The system may also include one or more communication links over which data can be transmitted. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
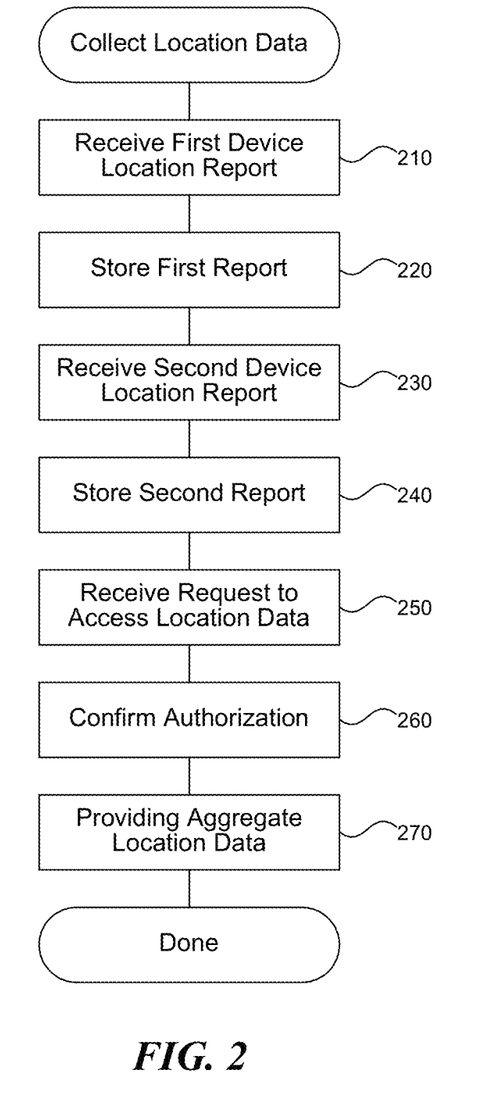
FIG. 2 is a flow diagram that illustrates processing of the location collection system to receive and report location data from multiple devices associated with one or more users, in one embodiment.

FIG. 2 is a flow diagram that illustrates processing of the location collection system to receive and report location data from multiple devices associated with one or more users, in one embodiment.

Beginning in block 210, the system receives from a first device a first device location report via a uniform interface callable from multiple devices. The location report may include latitude and longitude information or other specification of location. In some cases, the report may approximate the device's location based on available information. The location report may come from a user's mobile device, such as a cell phone, and may be uploaded periodically by invoking the interface on a central service that collects location information.

Continuing in block 220, the system stores the received first device location report securely in a centrally accessible data store. The system stores the report in a manner that applications associated with the device making the report or other devices associated with the same user can access the data. The system may also make anonymized, aggregate location data available for analysis. The centrally accessible data store collects information from multiple device types in one location, so that a comprehensive view of location data is available irrespective of the device on which it is collected and without needing to convince every user to use the same device and/or application for reporting location data.

Continuing in block 230, the system receives from a second device a second device location report via the uniform interface. The second device may be of a different type, form factor, manufacturer, or may differ in other ways from the first device. The second device may also be running a different application or operating system for reporting device location. However, because both devices invoke the same uniform interface, location data can be collected from both devices in a similar manner.

Continuing in block 240, the system stores the received second device location report securely in the centrally accessible data store. The second device may be a device associated with the same user as the first device or may be associated with a different user entirely. For example, the first device may be a first user's cell phone and the second device may be a second user's tablet computer. By providing a central and uniform location data service, the system is able to collect location data from virtually any location aware device with a network connection or periodic access to a network.

Continuing in block 250, the system receives a request to access location information reported by the first and second device. For example, a data analysis application associated with a business may request location data for employees of the business that are using a company provided device (such as shipping companies provide to their drivers). The data analysis application may run on another mobile device, on a desktop computer, in the cloud, or in some other location that may or may not be the same as either of the first and second device.

Continuing in block 260, the system determines whether a requesting user associated with the received request has proper authorization to access the requested location data. For example, the system may perform an invitation/acceptance handshake in which users have to invite other users to be able to view their location data or accept invitations from other users for those users to be granted such access. The system may store user profile information that includes authentication and access information, such as user identity information, access control lists that determine who can access the user's location data, and so forth.

Continuing in block 270, the system provides location data based on the received first and second location report upon determining that the request user is authorized to receive the location data. The provided data may include the raw individual reports or aggregated information that summarizes both reports. The provided data may also include additional data derived from the original data, such as identified trends or patterns in the data, predictive information about future location data, and so forth. After block 270, these steps conclude.

Figure 3:
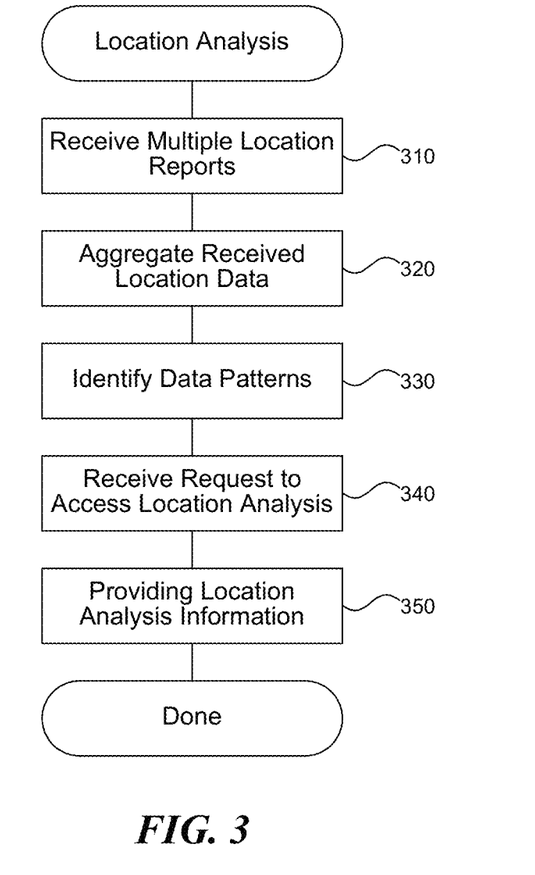
FIG. 3 is a flow diagram that illustrates processing of the location collection system to aggregate and report location pattern information, in one embodiment.

FIG. 3 is a flow diagram that illustrates processing of the location collection system to aggregate and report location pattern information, in one embodiment.

Beginning in block 310, the system receives multiple location data reports over a period of time, wherein the system receives the reports from multiple device types via uniform interface for reporting location data. For example, the system operator may provide an API that mobile operating systems or applications can call to provide anonymous or user-identified location data. The system operator may provide the vendors of the operating system or applications with access to the data for answering trend-based questions in return for providing the data. The system operates on an opt-in model in which no information is collected for any user that does not opt in to providing the data. This is commonly done today for individual device types. For example, GPS device vendors may upload traffic information at various locations from each device they manufacture.

Continuing in block 320, the system aggregates the received location data and removes user identifying information from an aggregated copy of the data. This allows analysis of multi-user and multi-device trends without exposing information of any individual user without authorization. Aggregation may include summarizing the data, adding up occurrences of an event, performing statistical analysis of highs, lows, averages, and so forth.

Continuing in block 330, the system identifies one or more patterns in the aggregated data. For example, the system may identify that devices at a particular location in a city do not move faster than a particular speed. This information can lead to the conclusion that a particular street could be revised to permit better flows of traffic. As another example, the system may observe that a quantity of devices reporting location data at a particular location increases during a particular hour and may determine that some interesting event occurs at that location at that time.

Continuing in block 340, the system receives a request to access location analysis information that includes the aggregated location data and identified patterns. For example, an application may invoke a uniform interface for requesting location analysis information from a centralized location analysis service. The interface may include a web page, web service, cloud API, or other facility for accessing data. The request may come from another mobile application other than those that report device location data or from a non-mobile application. The system may also provide an extensible facility through which developers can provide custom data analysis logic to analyze location data in specific ways. The request may include a specification of a specific type of analysis or output data requested in response.

Continuing in block 350, the system provides the requested location analysis information in response to the request. The response mirrors the request and may be an HTTP response or any other protocol understood by the requestor and responding service. The provided information may be anonymized to remove any data that could identify a particular user. In some cases, the system may not report information for which there are too few data points such that user information is not sufficiently aggregated with other user information to be unidentifiable. After block 350, these steps conclude.

Figure 4:
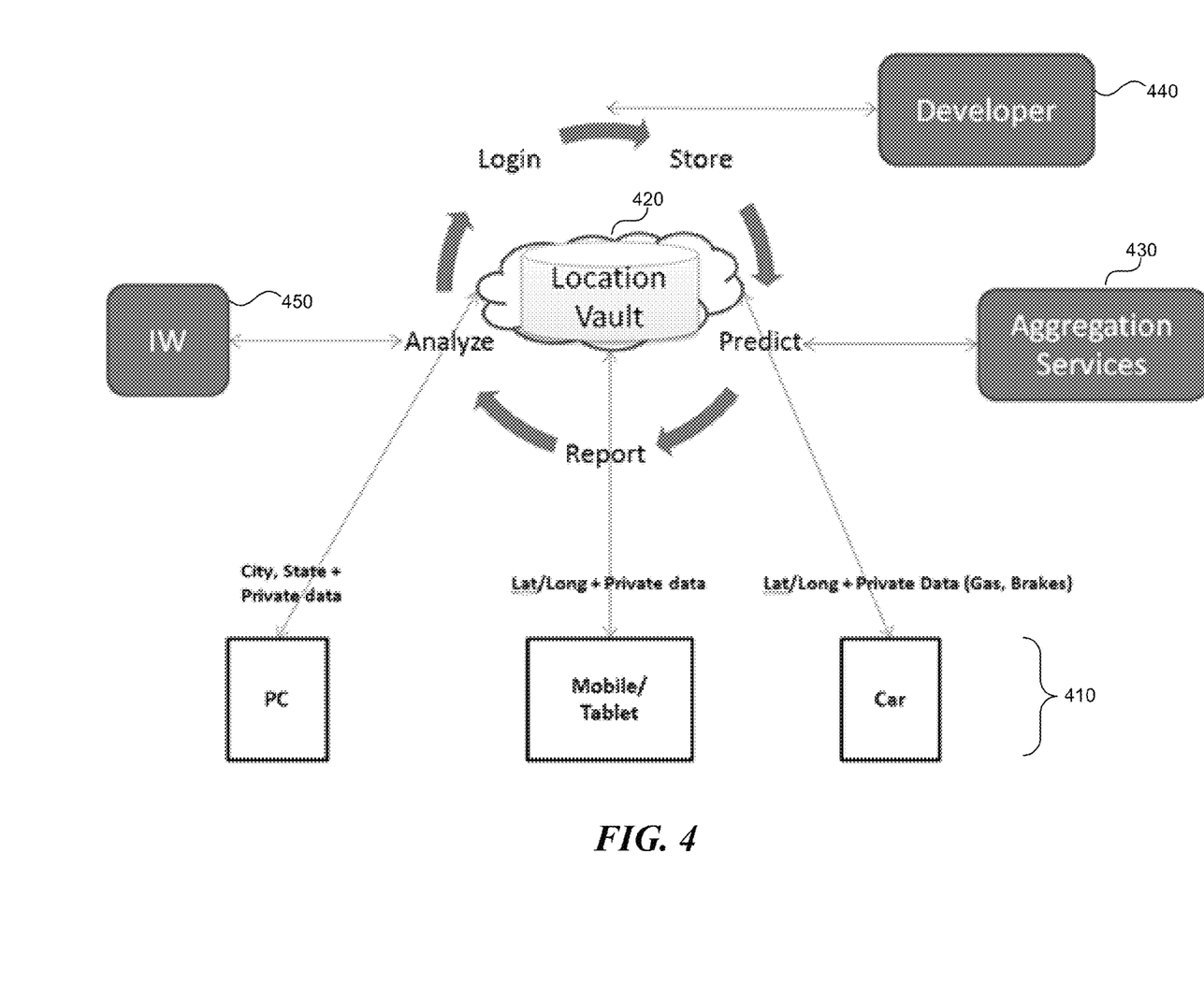
FIG. 4 is a data flow diagram that illustrates data flowing into and out of the data collection system, in one embodiment.

FIG. 4 is a data flow diagram that illustrates data flowing into and out of the data collection system, in one embodiment. A variety of devices 410 report location data periodically to a location vault 420. The location data may include generic data, such as latitude and longitude, as well as device specific metadata such as information on acceleration and braking from a car. Aggregation services 430 aggregate the data from many devices over multiple reporting cycles to predict and identify trends. Developers 440 can write applications that access the location data and aggregated information for a variety of application purposes. Information workers 450 use the applications to apply location data in new ways, such as to predict sales, design marketing campaigns, plan events, and so forth.

In some embodiments, the location collection system provides various slices of location data at different access levels. For example, the system may provide an identified user with unlimited access to that user's own location data. When other people request location data, they may only be able to access anonymized versions of data. In the middle, some users may have access to some data identifying a user but not other data (e.g., work related data accessible by the user's manager). Thus, the system can dynamically create slices or views of data that have differing access permissions and paradigms.

In some embodiments, the location collection system analyzes location data to provide predictive output about user behavior. For example, the system may report that a number of users are gathering at the same location, or are on their way to some well-known event. Police or other public servants may use applications to determine where the largest gatherings of people will be at a particular time, based on historical and predictive information about user behavior.

In some embodiments, the location collection system leverages large-scale analysis servers to perform analysis not possible or that is difficult on mobile devices. For example, the system may employ a compute cloud like that provided by MICROSOFT™ AZURE™ or use distributed processing techniques like Map Reduce and Hadoop to perform large-scale computations on large amounts of location data to derive particular analyses that no single device has the computing power to compute. The results of this analysis can then be sent to individual or multiple devices for acting upon.

From the foregoing, it will be appreciated that specific embodiments of the location collection system have been described herein for purposes of illustration, but that various modifications may be made without deviating from the spirit and scope of the invention. Accordingly, the invention is not limited except as by the appended claims.

We claim:

1. A computer-implemented method to receive and report location data from multiple devices associated with one or more users, the method comprising:
receiving from a first device a first device location report via a uniform interface callable from multiple devices;
storing the received first device location report securely in a centrally accessible data store;
receiving from a second device a second device location report via the uniform interface;
storing the received second device location report securely in the centrally accessible data store;
receiving a request to access location information reported by the first and second device;
determining whether a requesting user associated with the received request has proper authorization to access the requested location data, wherein the authorization to access the requested location data is allowed for a defined period of time; and
providing location data based on the received first and second location report upon determining that the request user is authorized to receive the location data,
wherein the preceding steps are performed by at least one processor.

2. The method of claim 1 wherein receiving the first device report comprises receiving latitude and longitude information from a device.

3. The method of claim 1 wherein receiving the first device report comprises receiving global positioning system (GPS) information from a mobile device with GPS hardware.

4. The method of claim 1 wherein receiving the first device report comprises receiving a periodic upload of location data from the device to a central service that collects location information.

5. The method of claim 1 wherein storing the first report comprises storing the report in a manner that applications on a device different than the first device can access the data.

6. The method of claim 1 wherein storing the first report comprises storing access control information that restricts how the stored report can be accessed.

7. The method of claim 1 wherein storing the first report comprises anonymizing the data so that a user associated with the first device cannot be identified.

8. The method of claim 1 wherein the centrally accessible data store generates from the first and second report a comprehensive view of location data available irrespective of the device on which the data is collected.

9. The method of claim 1 wherein the first device and second device are different devices of the same user.

10. The method of claim 1 wherein the first device and second device are associated with two different users.

11. The method of claim 1 wherein receiving the request to access location information comprises a data analysis application associated with a business requesting location data for employees of the business that are using a company provided device.

12. The method of claim 1 wherein receiving the request to access location information comprises receiving information identifying a user associated with the request for determining access to the requested information.

13. The method of claim 1 wherein determining authorization comprises performing an invitation/acceptance handshake in which users have to invite other users to be able to view their location data or accept invitations from other users for those users to be granted such access.

14. A computer system for providing a secure location collection and analysis service, the system comprising:
- a processor and memory configured to execute software instructions embodied within the following components;
- a location data store that stores location data collected from multiple devices;
- a location detection component that operates at a user device to determine a present location of the device;
- a location reporting component that reports location information to a uniform interface callable by multiple applications and devices and provided by a centrally available service;
- a location aggregation component that aggregates location information reported by multiple users and multiple devices to provide summary location information, and determines if a threshold number of users has been exceeded;
- a location analysis component that provides one or more data analysis tools for detecting trends in aggregated location information, when data is available from a number of the multiple users that exceeds the threshold number of users; and
- a location access component that provides a uniform interface for accessing collected and aggregated location information and analysis.

15. The system of claim 14 wherein the location data store receives location data reported from a variety of devices, users, applications, and other sources and collects the data for subsequent analysis.

16. The system of claim 14 wherein the location reporting component collects location data for some period and reports data collected over time in a batch.

17. The system of claim 14 wherein the location aggregation component anonymizes data by removing user identifying information before providing the data in any form that could allow an unauthorized party to access information related to a user.

18. The system of claim 14 wherein the location analysis component provides predictive analysis of where one or more users or devices will be located at a future time.

19. The system of claim 14 wherein the location access component requests authentication information and compare received authentication information with stored user profile data to restrict who can access what location data.

20. A computer-readable storage device comprising instructions for controlling a computer system to aggregate and report location pattern information, wherein the instructions, upon execution, cause a processor to perform actions comprising:
- receiving multiple location data reports over a period of time, wherein the system receives the reports from multiple device types via uniform interface for reporting location data;
- aggregating the received location data and removing user identifying information from an aggregated copy of the data;
- identifying one or more patterns in the aggregated data when a number of users providing the data reports exceeds a threshold number of users;
- receiving a request to access location analysis information that includes the aggregated location data and identified patterns; and
- providing the requested location analysis information in response to the request.

* * * * *